(12) United States Patent
Jubin et al.

(10) Patent No.: US 9,389,434 B2
(45) Date of Patent: *Jul. 12, 2016

(54) CONTACT LENSES WITH IMPROVED OXYGEN TRANSMISSION

(71) Applicant: Johnson & Johnson Vision Care, Inc., Jacksonville, FL (US)

(72) Inventors: Philippe F. Jubin, Fernandina Beach, FL (US); Pierre-Yves Gerligand, Jacksonville, FL (US); Fang Yuan, Jacksonville, FL (US); Radhakrishnan Damodharan, Jacksonville, FL (US); Noel A. Brennan, Ponte Vedra Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 170 days.

This patent is subject to a terminal disclaimer.

(21) Appl. No.: 14/087,625

(22) Filed: Nov. 22, 2013

(65) Prior Publication Data

US 2015/0146160 A1     May 28, 2015

(51) Int. Cl.
G02C 7/00 (2006.01)
G02C 7/02 (2006.01)
G02C 7/04 (2006.01)

(52) U.S. Cl.
CPC ..................................... *G02C 7/049* (2013.01)

(58) Field of Classification Search
CPC ............ G02C 7/04; G02C 7/048; G02C 7/02; G02B 3/14
USPC ................ 359/159.01, 159.02, 159.04, 159.2
See application file for complete search history.

(56) References Cited

U.S. PATENT DOCUMENTS

| | | | |
|---|---|---|---|
| 3,833,786 A | | 9/1974 | Brucker |
| 4,618,227 A * | | 10/1986 | Bayshore ................. 351/159.41 |
| 4,732,715 A | | 3/1988 | Bawa |
| 5,166,710 A * | | 11/1992 | Hofer et al. ............. 351/159.04 |
| 5,922,249 A | | 7/1999 | Ajello |
| 8,801,176 B2 * | | 8/2014 | Roffman et al. ......... 351/159.36 |
| 2002/0021409 A1 | | 2/2002 | Marmo |
| 2003/0151718 A1 * | | 8/2003 | Marmo et al. ................. 351/161 |
| 2004/0061828 A1 | | 4/2004 | Newman |
| 2006/0181676 A1 * | | 8/2006 | Tucker et al. .................. 351/162 |

(Continued)

FOREIGN PATENT DOCUMENTS

| | | |
|---|---|---|
| RU | 2066872 C1 | 9/1996 |
| RU | 2424543 C | 7/2011 |
| WO | WO8907281 A1 | 8/1989 |
| WO | WO9107687 A1 | 5/1991 |

OTHER PUBLICATIONS

Chhabra, M., et al., "Modeling Corneal Metabolism and Oxygen Transport During Contact Lens Wear", Optometry and Vision Science, vol. 86, No. 5 (May 2009), pp. 454-466.

(Continued)

*Primary Examiner* — James Greece
(74) *Attorney, Agent, or Firm* — Carl J. Evens

(57) ABSTRACT

Contact lenses may be designed with locally thinned regions to increase oxygen transmissibility to the eye. The locally thinned regions are preferably positioned outside of the optic zone and in the thicker peripheral zone. For a contact lens formed from a specific material, creating local thinner regions, for example, dimples in the back curve surface of the lens, provides an effective and efficient means for increasing oxygen diffusion.

9 Claims, 7 Drawing Sheets

(56) References Cited

U.S. PATENT DOCUMENTS

2006/0290883 A1    12/2006    Rosenthal
2012/0206692 A1     8/2012    Yamaguchi
2012/0242950 A1     9/2012    Roffman
2013/0182214 A1*    7/2013    Hofmann et al. ........ 351/159.04

OTHER PUBLICATIONS

Morrison, DR & Edelhauser, HF, Permeability of Hydrophilic Contact Lenses, *Investigative Ophthalmology & Visual Science*, Jan. 1972, vol. 11, No. 1, pp. 58-63.

* cited by examiner

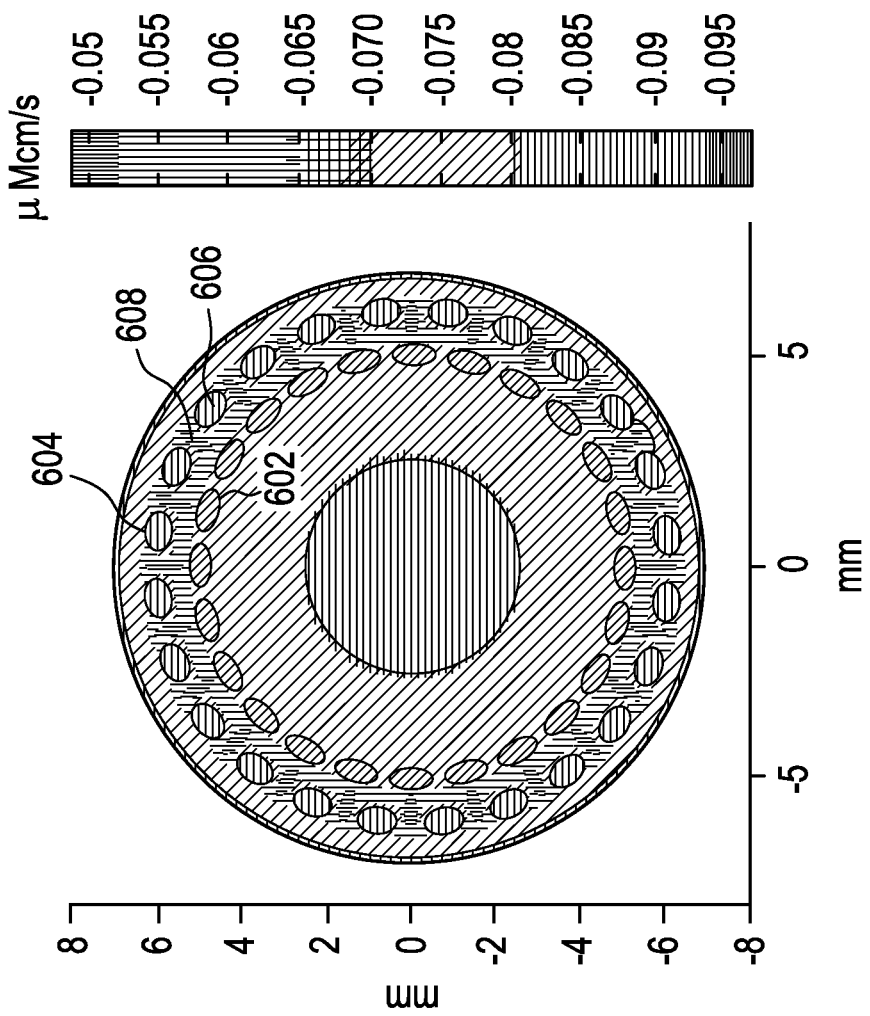

CONTACT LENSES WITH IMPROVED OXYGEN TRANSMISSION

BACKGROUND OF THE INVENTION

1. Field of the Invention

The present invention relates to ophthalmic lenses, and more particularly to contact lenses incorporating features that enhance oxygen transmission to the cornea.

2. Discussion of the Related Art

Myopia or nearsightedness is an optical or refractive defect of the eye wherein rays of light from an image focus to a point before they reach the retina. Myopia generally occurs because the eyeball or globe is too long or the cornea is too steep. A minus powered spherical lens may be utilized to correct myopia. Hyperopia or farsightedness is an optical or refractive defect of the eye wherein rays of light from an image focus to a point behind the retina. Hyperopia generally occurs because the eyeball or globe is too short or the cornea is too flat. A plus powered spherical lens may be utilized to correct hyperopia. Astigmatism is an optical or refractive defect in which an individual's vision is blurred due to the inability of the eye to focus a point object into a focused image on the retina. Unlike myopia and/or hyperopia, astigmatism has nothing do to with globe size or cornea steepness, but rather it is caused by an abnormal curvature of the cornea. A perfect cornea is spherical whereas in an individual with astigmatism, the cornea is not spherical. In other words, the cornea is actually more curved or steeper in one direction than another, thereby causing an image to be stretched out rather than focused to a point. A cylindrical lens rather than a spherical lens may be utilized to resolve astigmatism.

Contact lenses may be utilized to correct myopia, hyperopia, astigmatism as well as other visual acuity defects. Contact lenses may also be utilized to enhance the natural appearance of the wearer's eyes. In other words, contact lenses may be colored or tinted to provide a variety of effects to the appearance of the eye. A number of different types of tinted contact lenses are currently available to enhance an individual's eye color or change it altogether. Contact lenses comprising cosmetic enhancement tints are designed to enhance ones natural eye color and are best suited for light-colored eyes such as blues, greens, hazels and grays. Contact lenses comprising opaque tints are designed to change the color of dark eyes. These lenses are patterned and are designed to cover the iris while providing a natural look. Contact lenses may also comprise visibility tints which are designed to make the lens visible during handling with no discernible effect on eye color.

Based upon the above, the primary functions of contact lenses are vision correction and/or enhancement, cosmetic enhancement and/or both vision correction and cosmetic enhancement. However, contact lenses are also preferably designed to ensure that sufficient levels of oxygen are supplied to the eye, specifically, the cornea, to promote cornea health and growth. An inadequate amount of oxygen supplied to the cornea may result in a number of negative effects on eye health, including edema. Soft contact lenses represented a significant improvement over hard contact lenses with respect to oxygen permeability; however, the amount of oxygen transmitted through a soft contact lens is limited by both the material oxygen permeability, Dk, and the material thickness, t. Accordingly, there exists a need for a soft contact lens that is comfortable to wear and allows more oxygen to easily and quickly diffuse therethrough. More particularly, while increased oxygen transmissibility can be achieved by reformulating a given material, there also exists a need for soft contact lenses with increased oxygen transmissibility utilizing existing and proven materials, for example, hydrogels and silicone-hydrogels.

SUMMARY OF THE INVENTION

The ophthalmic lenses of the present invention overcome the oxygen transmissibility disadvantages associated with the prior art as briefly described above.

In accordance with one aspect, the present invention is directed to an ophthalmic device. The ophthalmic device comprising contact lenses, each contact lens including an optic zone, a peripheral zone surrounding the optic zone, a front curve surface and a back curve surface, and at least one discrete thinned region in the peripheral zone configured to increase oxygen transmissibility in the discrete thinned region and an area surrounding the discrete thinned region. The at least one discrete thinned region cover from about five percent to about seventy-five percent of the surface area of the peripheral zone, has a depth of between five and three-hundred microns.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability and are generally more comfortable to wear than the contact lenses made of the earlier hard materials.

Currently available contact lenses remain a cost effective means for vision correction. The thin plastic lenses fit over the cornea of the eye to correct vision defects, including myopia or nearsightedness, hyperopia or farsightedness, astigmatism, i.e. the cornea is more curved or steeper in one direction, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal and multifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

In accordance with the present invention, the design of the contact lenses is altered to increase oxygen transmissibility without changing the material from which the lens is fabricated. The basic principle of the present invention is to increase the oxygen transmission through a contact lens by reducing the lens thickness locally. In other words, it is possible to increase oxygen transmission through a contact lens by creating local areas of thickness reduction, i.e. dimples in the surface of the lens.

Oxygen transmissibility through a given material is represented by the ratio Dk/t, where D represents diffusivity, a measure of how fast oxygen moves through the material, k represents solubility, a measure of how much oxygen is in the material, and t is the thickness of the material. As this ratio shows, oxygen transmissibility may be increased by increasing the material oxygen permeability, Dk, or reducing the lens thickness. It is preferable to increase the ratio in the thickest regions of the lens which have the lowest Dk/t ratio given that the material does not change. In accordance with the present invention, dimples in the surface of the lens create localized areas of reduced thickness, thereby increasing oxygen transmissibility.

The localized reduction of thickness in a contact lens allows for increased oxygen transmission to the eye without having to change the material. The localized reductions in thickness have no impact on the optical quality of the lens and are simple and inexpensive to fabricate.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 6 is a Chhabra model of oxygen flux through a dimpled contact lens in accordance with the present invention.

DETAILED DESCRIPTION OF THE PREFERRED EMBODIMENTS

Figure 1:
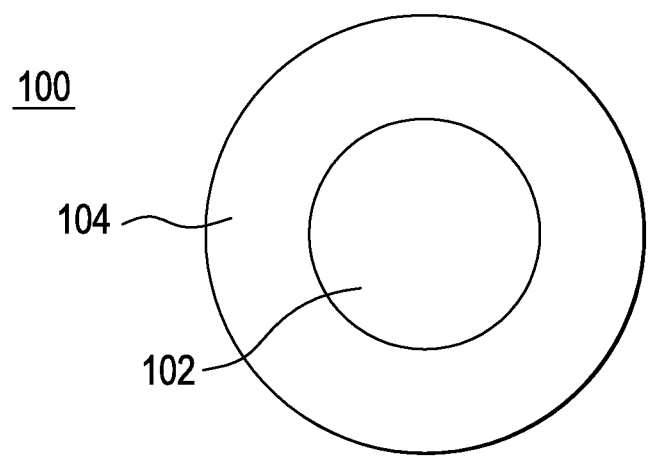
FIG. 1 is a plan view of an exemplary contact lens.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. However, these new contact lenses are not totally without limitations.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer-plastic materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from silicone polymers but are more rigid than soft contact lenses, do not contain water, and thus hold their shape and are more durable, but generally less comfortable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Soft contact lenses are typically more comfortable to wear than rigid gas permeable hard contact lenses. Currently available contact lenses are made from silicone hydrogels, including etafilcon, galyfilcon, senofilcon and narafilcon. Other silicone hydrogels include lotrafilcon, balafilcon, vifilcon and omafilcon. These materials typically have a low modulus of elasticity, for example, etafilcon A has a Young's modulus of about $0.3 \times 10^6$ Pa, galyfilcon A has a Young's modulus of about $0.43 \times 10^6$ PA, senofilcon A has a Young's modulus of about $0.7 \times 10^6$ Pa, balafilcon A has a Young's modulus of about $1.1 \times 10^6$ Pa, and lotrafilcon A has a Young's modulus of about $1.4 \times 10^6$ Pa. Because the modulus of elasticity is so low for some of these materials, the thickness of the lens may have to be increased in certain regions in order to achieve an acceptable lens stiffness. For example, in astigmatic vision correction, mechanical features are designed into the periphery of the contact lens to achieve rotational stability on eye for the required vision correction. These mechanical features typically incorporate varying thickness around the lens periphery, thereby potentially altering oxygen transmission. Other types of lenses also have thicker and thinner regions for various reasons. Accordingly, to increase the oxygen transmission through a comfortable, proven contact lens made from a well-known material, localized thinner regions may be created, for example, through the use of dimples as is explained in detail subsequently.

Referring now to FIG. 1, there is illustrated a plan view of an exemplary contact lens 100. The contact lens 100 comprises an optic zone 102, a peripheral zone 104 surrounding the optic zone 102, a back curve surface designed to make contact with an individual's eye when worn and a front curve surface opposite the back curve surface. The optic zone 102 is the portion of the contact lens 100 through which vision correction is obtained. In other words, the optic zone 102 provides vision correction and is designed for a specific need such as single vision myopia or hyperopia correction, astigmatism vision correction, bi-focal vision correction, multi-focal vision correction, custom correction or any other design that may provide vision correction. The peripheral zone 104 surrounds the optic zone 102 and provides mechanical stability for the contact lens 100 on the eye. In other words, the peripheral zone 104 provides mechanical features which influence positioning and stabilization of the contact lens 100 on the eye, including centration and orientation. Orientation is fundamental when the optic zone 102 includes non-rotationally symmetric features, such as astigmatic correction and/or high order aberration correction. In some contact lens designs, an optional intermediate zone between the optic zone 102 and the peripheral zone 104 may be utilized. The optional intermediate zone ensures that the optic zone 102 and the peripheral zone 104 are smoothly blended.

It is important to note that both the optic zone 102 and the peripheral zone 104 may be designed independently, though sometimes their designs are strongly related when particular requirements are necessary. For example, the design of a toric contact lens with an astigmatic optic zone might require a particular peripheral zone for maintaining the contact lens at a predetermined orientation on the eye. Toric contact lenses have different designs than spherical contact lenses. The optic zone portion of toric contact lenses has two powers, spherical and cylindrical, created with curvatures generally at right angles to each other. The powers are required to maintain position at a specific angle, cylinder axis, on the eye to provide the required astigmatic vision correction. The mechanical or peripheral zone of toric contact lenses typically comprise a stabilization means to properly rotate and orient the cylindrical or astigmatic axis into position while being worn on the eye. Rotating the contact lens to its proper position when the contact lens moves, or when the contact lens is initially inserted is important in producing a toric contact lens. The stabilization zones may comprise any suitable configuration, for example, thicker regions strategically placed. Other lenses, for example, lenses for presbyopia may also require features in the peripheral zone 104. These features act to ensure that specific portions of the optic zone 102 are positioned correctly when eye gaze changes. These features may comprise truncations or thickened sections of the peripheral zone 104. It is important to note that while the exemplary contact lens 100 shown in FIG. 1 is illustrated as circular and/or annular, non-circular zones and/or non-annular configurations are possible. In addition, the edge of the rim may be planar or non-planar.

Figure 2:
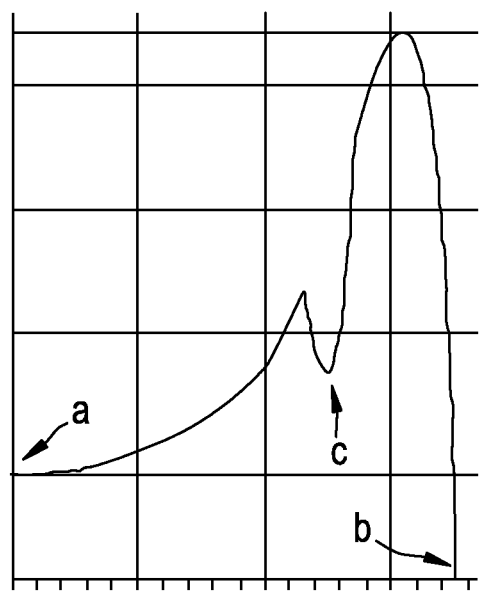
FIG. 2 is a plot of lens thickness from the lens center to the lens edge with dimples in the mid-peripheral range in accordance with the present invention.

As set forth above, oxygen transmissibility through a given material is represented by the ratio Dk/t, where D is diffusability, k is solubility and t is thickness. If one desires to increase oxygen transmissibility through a contact lens without changing the material, then the thickness, t, of the lens is preferably changed. It is particularly advantageous to increase the Dk/t ratio in the thickest regions of the lens, which have the lowest Dk/t. Accordingly, in order to increase oxygen transmission or oxygen transmissibility through a contact lens, the lens thickness is preferably reduced locally. By limiting it to local thinning, the basic characteristics of the lens design remains unchanged, for example, no change to the lens stiffness or mechanical features in the peripheral zone. One way to reduce the local thickness of a contact lens is to form surface depressions or dimples. The impact of adding dimples to the lens back curve surface, for example, is illustrated in FIG. 2, which is a plot of the lens thickness from the lens center to the lens edge. The vertical axis is thickness and the horizontal axis is distance from lens center to lens edge. The plot illustrates the cross-sectional thickness from the lens center, point a, to the lens edge, point b, and showing the impact of the dimple on mid-peripheral thickness, point c.

Figure 3A:
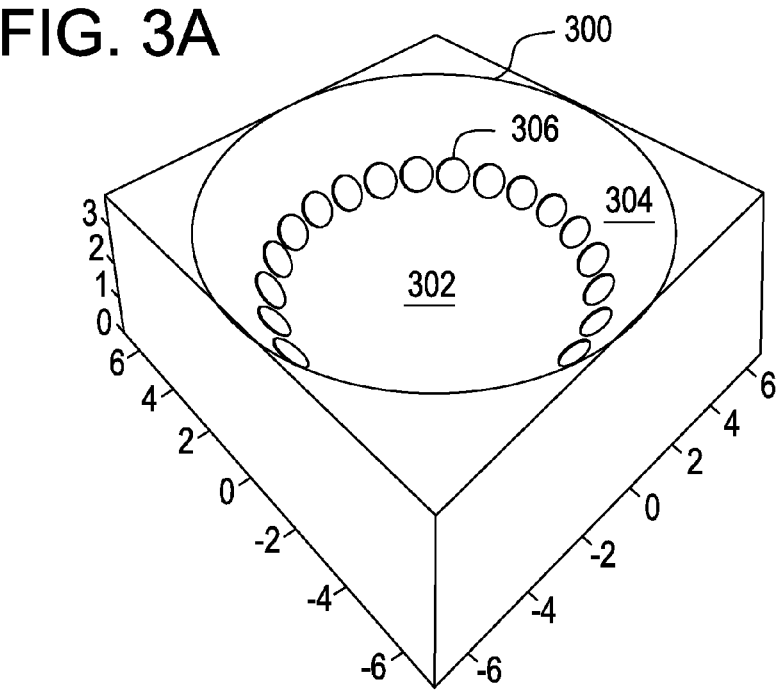
FIGS. 3A, 3B and 3C illustrate exemplary dimple patterns in a contact lens in accordance with the present invention.
Figure 3B:
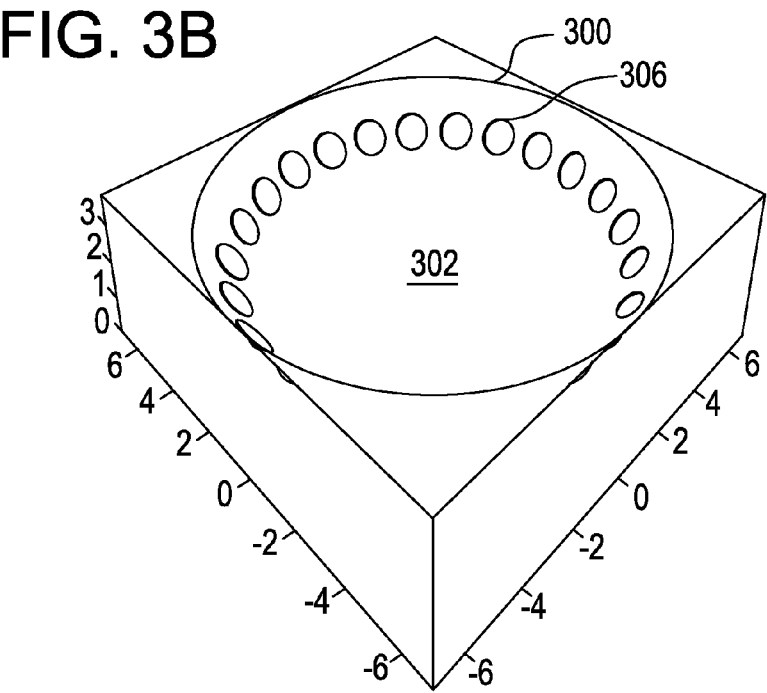
Figure 3C:
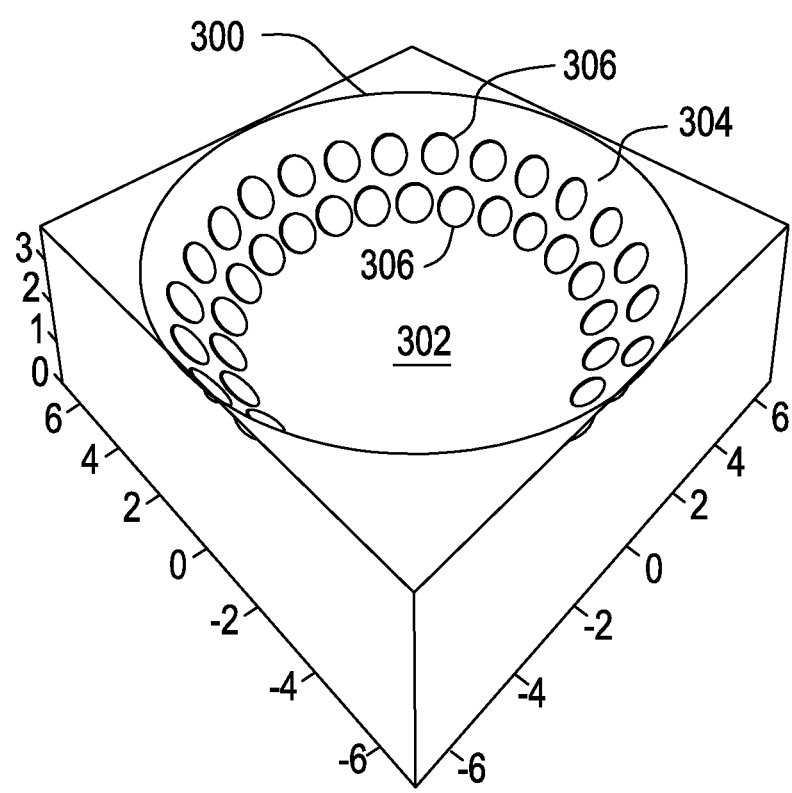
Figure 4:
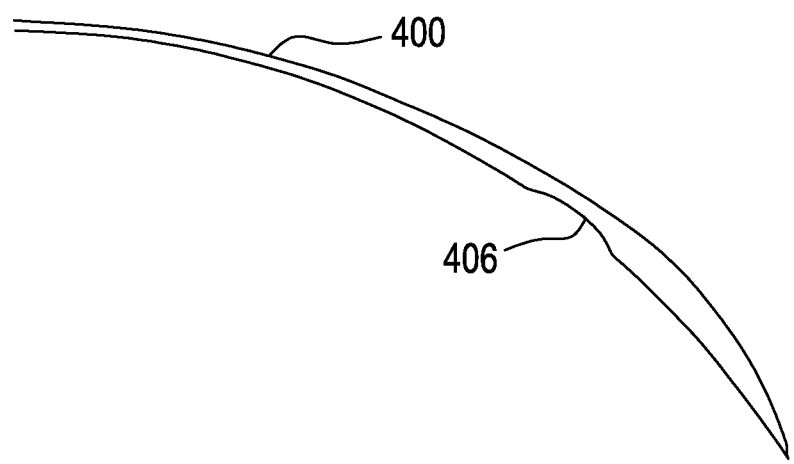
FIG. 4 is a cross-sectional view of a single dimple in the mid-peripheral region of a contact lens in accordance with the present invention.

Referring now to FIGS. 3A, 3B and 3C, there are illustrated various exemplary configurations of dimples 306 in the peripheral zone 304 of a contact lens 300. While dimples 306 may be positioned in the optic zone 302, it is preferable to locate the dimples in the peripheral zone 304 of the contact lens 300 in order to avoid optical interference. However, the dimples 306 may be placed in either or both the front or back curve surfaces. FIG. 4 is a ½ cross-sectional view or a profile of a contact lens 400 illustrating a single dimple 406 in the back curve surface. The number, size, depth, shape and distribution of dimples should preferably be optimized in order to maximize the desired local Dk/t, but also to minimize the impact on handling characteristics, physiology and comfort. The number and location of dimples depends on the desired coverage area and size of each dimple. For contact lenses which do not move much during wear time, a larger coverage area is desirable so that more oxygen reaches the cornea. For contact lenses that move moderately on the eye, a lower coverage area is sufficient since the lens movement will inherently result in a larger coverage area. A preferred range of dimple coverage is about five (5) percent to about seventy-five (75) percent of the surface area of the peripheral region.

The depth of the dimples depends on the desired increase in Dk/t, which as explained herein, is a function of the material and contact lens design thickness. A preferred range of dimple depth is about five (5) microns to about three-hundred (300) microns. The diameter of each dimple may vary depending on a number of factors, including the desired amount of surface area to cover and the number of dimples. Each dimple may be the same size or they may be of unequal size. A preferred range of dimple diameter is from about twenty (20) microns to about one thousand (1,000) microns. The dimples may be on either or both the front and/or back, curve surfaces. However, it should be noted that front curve surface dimples would need to be of a size and shape so as not to interfere with the normal flow of tears across the lens surface and not affect the comfort of the lens and/or the eyelid physiology.

Figure 5A:
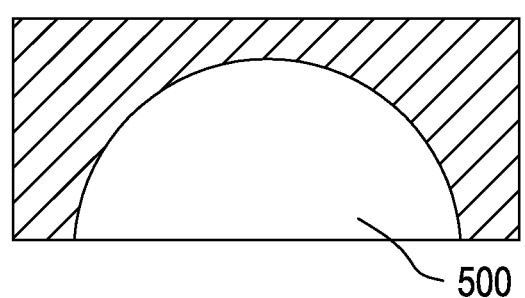
FIGS. 5A-5D are exemplary cross-sectional shapes of dimples in accordance with the present invention.
Figure 5B:
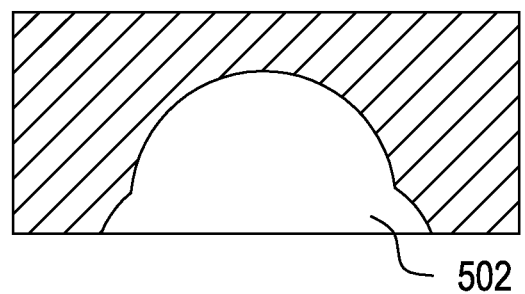
Figure 5C:
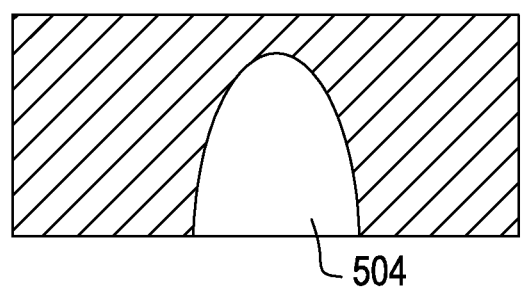
Figure 5D:
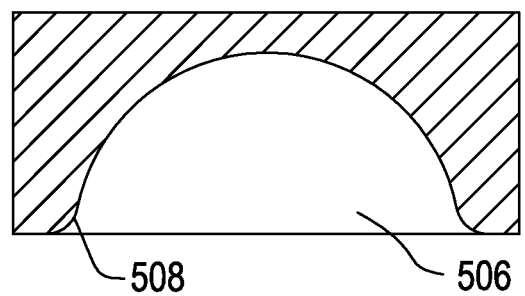

The distribution of the dimples on the contact lens surface does not need to be structured or have a regular structure, i.e. it may comprise a random distribution so as long as it covers the required lens surface area. In addition, the cross-sectional shape of the dimples may comprise any suitable configuration. Referring to FIGS. 5A-5C, several exemplary embodiments are illustrated. In FIG. 5A, the cross-sectional shape of the dimple 500 is circular. In FIG. 5B, the cross-sectional shape of the dimple 502 is recessed. In FIG. 5C, the cross-sectional shape of the dimple 504 is aspheric. In FIG. 5D, the cross-sectional shape of the dimple 506 uses a fillet 508 so as to provide a smooth transition with the underlying substrate. The shape may be modified to balance increased oxygen transmissibility and comfort.

The impact of dimples on the oxygen flux through the contact lens, as calculated utilizing the Chhabra model (Mahendra Chhabra, John M. Prausnitz and Clayton J. Radke: "Modeling Corneal Metabolism and Oxygen Transport during Contact Lens Wear," Optometry and Vision Sciences, vol. 86, no. 5, pp. 454-466, (2009)) is illustrated in FIG. 6. Both the x axis and the y axis are in mm. In this exemplary embodiment, two rows of dimples are formed in the back curve surface in the peripheral zone of the contact lens. The inner ring dimples 602 comprises dimples having a depth of about one-hundred (100) microns with a thickness of about one-hundred (100) microns of additional material beyond the dimples 602. The center of the inner ring of dimples 602 is about five (5) millimeters from the lens geometrical center. The outer ring of dimples 604 comprises dimples having a depth of about one-hundred forty (140) microns with a thickness of about one-hundred (100) microns of additional material beyond the dimples 604. The center of the outer ring of dimples 604 is about six (6) millimeters from the lens geometrical center. As illustrated, the oxygen flux is twice as large under the dimples 606 as compared to the surface area with no dimples 608. Oxygen flux or transmissibility is measured in micro molar—centimeter per second or μMcm/s.

Figure 7:
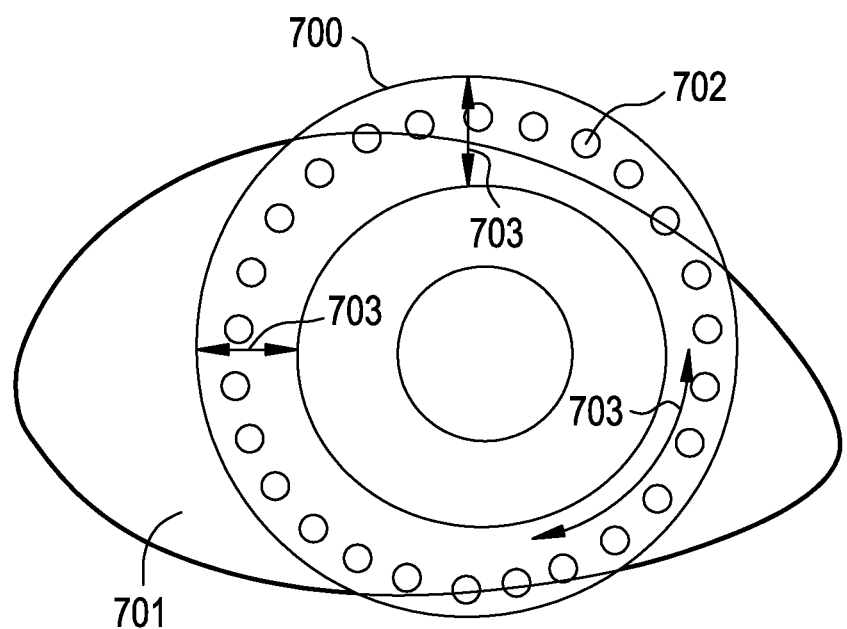
FIG. 7 is a plan view of an exemplary contact lens on an eye in accordance with the present invention.

As set forth above, it is preferable to form the dimples or any other suitable depression in the thickest region of the contact lens as these regions have the lowest Dk/t values. However, since the contact lens is continuously moving on the eye, for example, rotating and translating both horizontally and vertically, the increase in oxygen transmissibility due to the dimpled or depressed surface is not limited to the exact location of each dimple, but rather to the area of the eye that the dimples may cover at any point during wear time. Lateral diffusion of oxygen in the region of the dimples plus a degree of tear mixing during the blink will further oxygenate the tissues beneath regions of the contact lens not covered by the dimples. FIG. 7 is a diagrammatic representation of a contact lens 700 on an eye 701. As illustrated by arrows 703, the contact lens 700 may move horizontally, vertically and rotationally. The dimples 702 move with the lens, thereby exposing more of the eye 701 to the high transmissibility areas.

Contact lenses of the present invention incorporate depressions or thinner regions to improve oxygen transmissibility to the cornea. The preferred design features that perform this function are dimples on the back curve surface of the lens in the peripheral zone. The preferred dimple is circular when viewed from above, but the dimples may be triangular, square, pentagonal, hexagonal, heptagonal, octagonal or any suitable shape. In addition to these radial symmetric shapes the dimples may also have shapes such as ovals, ellipses or irregular patterns. Potential cross-sectional shapes include circular arc, truncated cone, flattened trapezoid, and profiles defined by a parabolic curve, ellipse, semi-spherical curve, saucer-shaped curve, sine curve, or the shape generated by revolving a catenory curve about its symmetrical axis. Other possible dimple designs include dimples within dimples and constant depth dimples. In addition, more than one shape or type of dimple may be utilized on a single surface.

It is important to note than any type of thinning feature may be utilized as long as it does not interfere with the optical features, the mechanical features, the performance features and the comfort features of the contact lens. In addition, although the dimples are arranged in substantially circular arrangements, any suitable arrangement is possible, including random, fractal and location-biased.

The contact lenses of the present invention may be made using any known process for contact lens production. Preferably, the lenses are made by photo curing the lens composition and applying a coating to the cured lens. Various processes are known for molding the reaction mixture in the production of contact lenses, including spincasting and static casting. The preferred method for producing contact lenses of the present invention is by the direct molding of the silicone hydrogels, which is economical, and enables precise control over the final shape of the hydrated lens. For this method, the reaction mixture is placed in a mold having the shape of the final desired silicone hydrogel, i.e. water-swollen polymer, and the reaction mixture is subjected to conditions whereby the monomers polymerize, to produce a polymer in the approximate shape of the final desired product. The conditions for such polymerization are well known in the art. The polymer mixture optionally may be treated with a solvent and then water, producing a silicone hydrogel having a final size and shape similar to the size and shape of the original molded polymer article. In a process such as molding, the dimple pattern is imparted to the mold by use of a mold tool having the dimple shape and depth. Molding processes are generally a two-step or more preferably a three step process, with an intermediate cast mold. In the three step process, the dimple is formed as a depressed portion in a concave master mold of the back surface. The master mold is preferably metallic, but may be ceramic. Metallic master molds are machined from steel, brass, aluminum or the like. The master mold is then used to generate an intermediate cast mold, in which the curve is now convex, and the dimple is present as a raised portion on the intermediate back curve cast mold. The final lens will be cast from the back curve cast mold, assembled along with a front curve mold created by the same process. In the two step process, non-hydrated lens polymer material will be directly processed, most preferably by precision lathing. In this case, the dimples are machined into the non-hydrated polymer material, with the dimples being depressions on the concave surface.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic device, the device comprising:
   contact lenses, each contact lens including an optic zone, a peripheral zone surrounding the optic zone, a front curve surface and a back curve surface; and
   at least one ring of dimples in the peripheral zone configured to increase oxygen transmissibility in the area of the at least one ring of dimples and an area surrounding the at least one ring of dimples, the center of the at least one ring of dimples is about 5 millimeters from a geometric center of the contact lens and comprise dimples extending around the peripheral region.

2. The ophthalmic device according to claim 1, wherein the dimples comprise a circular cross-sectional shape.

3. The ophthalmic device according to claim 1, wherein the dimples comprise a recessed and/or filleted cross-sectional shape.

4. The ophthalmic device according to claim 1, wherein the dimples comprise an aspheric cross-sectional shape.

5. The ophthalmic device according to claim 1, wherein the optic zone is configured to provide a single vision correction.

6. The ophthalmic device according to claim 1, wherein the optic zone is configured to provide astigmatic correction.

7. The ophthalmic device according to claim 1, wherein the optic zone is configured to provide presbyopic correction.

8. The ophthalmic device according to claim 1, wherein the optic zone is configured to provide custom vision correction.

9. The ophthalmic device according to claim 1, wherein the device is configured to provide a cosmetic effect.

* * * * *